United States Patent
Watanabe

(10) Patent No.: US 7,221,078 B2
(45) Date of Patent: May 22, 2007

(54) SPARK PLUG WITH IMPROVED NOBLE METAL CHIP

(75) Inventor: Tetsuya Watanabe, Okazaki (JP)

(73) Assignee: Denso Corporation (JP)

( * ) Notice: Subject to any disclaimer, the term of this patent is extended or adjusted under 35 U.S.C. 154(b) by 70 days.

(21) Appl. No.: 10/854,365

(22) Filed: May 27, 2004

(65) Prior Publication Data

US 2004/0239223 A1 Dec. 2, 2004

(30) Foreign Application Priority Data

May 29, 2003 (JP) .............................. 2003-152263

(51) Int. Cl.
*H01T 13/20* (2006.01)

(52) U.S. Cl. ...................... 313/141; 313/142; 313/143; 313/144; 313/145

(58) Field of Classification Search ................ 313/141, 313/142, 143, 144, 145, 118, 130, 131; 123/169 R, 123/169 EL
See application file for complete search history.

(56) References Cited

U.S. PATENT DOCUMENTS

| | | | |
|---|---|---|---|
| 5,488,262 A * | 1/1996 | Takamura | .................... 313/141 |
| 5,502,994 A * | 4/1996 | Katoh et al. | .................... 72/327 |
| 5,736,809 A | 4/1998 | Matsutani et al. | |
| 5,980,345 A | 11/1999 | Chang et al. | |
| 5,990,602 A * | 11/1999 | Katoh et al. | ................ 313/141 |
| 6,045,424 A | 4/2000 | Chang et al. | |
| 6,071,163 A | 6/2000 | Chang et al. | |
| 6,304,022 B1 | 10/2001 | Matsutani | |
| 2003/0038576 A1* | 2/2003 | Matsutani et al. | .......... 313/141 |
| 2003/0085202 A1* | 5/2003 | Niessner | .................. 219/117.1 |
| 2003/0155849 A1* | 8/2003 | Hori | ........................... 313/141 |
| 2004/0041506 A1* | 3/2004 | Teramura et al. | ........... 313/141 |
| 2005/0168121 A1* | 8/2005 | Tinwell | ...................... 313/141 |

FOREIGN PATENT DOCUMENTS

| | | |
|---|---|---|
| EP | 1168547 | 1/2002 |
| JP | 5-159857 | 6/1993 |
| JP | 5-166577 | 7/1993 |

(Continued)

OTHER PUBLICATIONS

Japanese Official Action dated May 23, 2006 issued in corresponding Japanese Appln. No. 2003-152263 with English translation.

(Continued)

*Primary Examiner*—Joseph Williams
*Assistant Examiner*—Hana Asmat Sanei
(74) *Attorney, Agent, or Firm*—Nixon & Vanderhye PC

(57) ABSTRACT

In a spark plug composed of a center electrode and an earth electrode, at least one of confronting portions of the center electrode and the earth electrode which are in opposed relation to each other is constructed with a noble metal chip containing Pt as a principal component. The noble metal chip is joined to an electrode base material of the center electrode or the earth electrode and is made of an alloy comprising Pt and another element. In this noble metal chip, Pt is contained as a first component, while Re is contained as a second component. The employment of this noble metal chip enables suppressing the growth of platinum balls even in a high-temperature atmosphere.

28 Claims, 5 Drawing Sheets

FOREIGN PATENT DOCUMENTS

| | | |
|---|---|---|
| JP | 7-249471 | 9/1995 |
| JP | 8-185954 | 7/1996 |
| JP | 9-92432 | 4/1997 |
| JP | 11-204233 | 7/1999 |
| JP | 2002-83663 | 3/2002 |
| JP | 2002-520791 | 7/2002 |
| JP | 2002-231411 | 8/2002 |

OTHER PUBLICATIONS

Japanese Official Action dated Dec. 19, 2006 issued in corresponding Japanese Appln. No. 2003-152263 with English translation.

* cited by examiner

SPARK PLUG WITH IMPROVED NOBLE METAL CHIP

BACKGROUND OF THE INVENTION

1) Field of the Invention

The present invention relates to a spark plug in which at least one of mutually confronting portions of a center electrode and an earth (ground) electrode which are in opposed relation to each other is constructed with a noble metal chip, and more particularly to a spark plug for use in a gas engine and the like, suitable for use at high temperature.

2) Description of the Related Art

In general, a spark plug is made up of a center electrode, an insulator located outside the center electrode, a housing located outside the insulator and an earth electrode whose one end portion is joined to the housing and whose other end portion is disposed to be in opposed relation to the center electrode in a state where a spark discharge gap is interposed therebetween, and it is employed as an ignition device.

In addition, for the purpose of improved durability and the like, there has been proposed a technique in which at least one of the confronting portions of the earth electrode and the center electrode is made in the form of a noble metal chip joined to an electrode base (matrix) material (for example, see Japanese Patent Laid-Open Nos. HEI 9-92432 and 2002-83663). In general, as a noble metal chip establishing a confronting portion between electrodes, there has been employed a Pt (platinum) alloy chip or an Ir (iridium) alloy chip.

In general, the Pt alloy chip is joined to an electrode base material by means of resistance welding, while the Ir alloy chip is joined to the electrode material through the use of the laser welding.

Meanwhile, in general, in the case of the Ir alloy chip joined to the electrode base material by the laser welding, its joint (bonding) reliability at high temperatures is lower than that of the Pt alloy chip joined to the electrode base material by resistance welding.

For example, the Ir alloy chip joined by the laser welding secures the joint reliability when the electrode temperature does not reach approximately 900° C., difficulty is encountered in reliably securing the joint when the electrode temperature exceeds this temperature. On the other hand, the Pt alloy chip joined by the resistance welding can provide sufficient joint reliability even if the electrode temperature exceeds approximately 900° C.

For this reason, in the case of a spark plug to be used in a high-temperature atmosphere where the Ir alloy chip cannot secure the joint reliability, the Pt alloy chip has been employed in order to secure the reliability of the joint between the noble metal chip and the electrode base material.

For example, in the case of a spark plug for use in a gasoline engine, the earth electrode temperature is below 700° C. in the normal use, whereas for a recently developed gas engine, such as cogeneration, the earth electrode temperature becomes as high as approximately 850° C. to 950° C. in normal use. For this reason, for the earth electrode of a spark plug for use in a gas engine, a Pt alloy chip has been employed as a noble metal chip having a high reliability at high temperatures.

However, although the Pt alloy chip is superior in the reliability of the joint with the electrode base material, platinum grains develop in high-temperature atmosphere, which creates a problem in that the platinum grains extend as a globular structure in the spark discharge gap and cause a short-circuit between the electrodes. Referring to FIGS. 5A and 5B, a description will be given hereinbelow of a concrete example examined by the present inventor about this problem.

FIGS. 5A and 5B illustratively show a discharge portion and a portion around it and are illustrations of the results of the experiment and observation by the present inventor, and FIG. 5A is an illustration of an initial state while FIG. 5B is an illustration of a state of the growth of platinum balls along with the use in a high-temperature atmosphere in a gas engine.

In this case, in a using state of the gas engine, since the temperature of a center electrode 30 is below 900° C., a confronting portion of the center electrode 30 is made as an Ir alloy chip 32 laser-welded to an electrode base material.

On the other hand, since the temperature of an earth electrode 40 is approximately 850 to 950° C., a confronting portion of the earth electrode 40 is made with a Pt alloy chip J43 resistance-welded to the electrode base material. A spark discharge gap 50 is defined between the Pt alloy chip J43 and the Ir alloy chip 32. In the case of a spark plug for a gas engine, this spark discharge gap has a dimension of approximately 0.15 mm to 0.6 mm.

Concretely, the earth electrode 40 side Pt alloy chip J43 is made of Ir of 20 weight %, with the remains being Pt. That is, it is made of Pt-20 Ir. The base material of the earth electrode 40 and the center electrode 30 is made of a Ni (nickel)-base alloy, such as Inconel (registered trademark).

As FIG. 5A shows, in the initial state, the interior of the earth electrode 40 side Pt alloy chip J43 almost entirely has a layer-like configuration. On the other hand, as FIG. 5(B) shows, along with the use, a discharge surface side portion of the Pt alloy chip J43 recrystallizes so that platinum crystal grains 70 separate, thereby changing from the layer-like configuration to a globular structure.

At the occurrence of this transformation, due to the influence of the discharge sputter, the platinum grains 70 grow up, and separate from the discharge surface of the chip J43 to grow up along a discharge path indicated by an arrow in FIG. 5B. When the grown-up platinum grains 70 reach the confronting center electrode 30 side Ir alloy chip 32, the short-circuit occurs between both the electrodes 30 and 40.

In particular, in the case of a spark plug for a gas engine, since the required discharge voltage is high, there is a need to set an initial spark discharge gap at as a smaller value as approximately 0.15 to 0.6 mm, as compared with an initial spark discharge gap (for example, approximately 1 mm) of a spark plug of a gasoline engine. Therefore, the aforesaid grown-up platinum grains 70 facilitate the occurrence of the short-circuit between the electrodes 30 and 40.

SUMMARY OF THE INVENTION

The present invention has been developed with a view to eliminating the above-mentioned problems, and it is therefore an object of the invention to, in a spark plug in which at least one of confronting portions of a center electrode and an earth electrode is made with a noble metal chip containing Pt as a principal component, provide a noble metal chip capable of suppressing the growth of an elongated globular structure during spark discharging even at a high-temperature atmosphere.

The present invention has experimentally found as a result of an energetic examination on the basis of the concept that the growth of platinum grains is suppressible by raising the melting point or hardness of a Pt alloy chip.

That is, in accordance with an aspect of the present invention, there is provided a spark plug comprising a center electrode (30), an insulator (20) provided outside the center electrode, a housing (10) located outside the insulator and an earth electrode (40) whose one end portion is joined to the housing and whose other end portion is disposed to be in opposed relation to the center electrode in a state where a spark discharge gap (50) is interposed therebetween, at least one of said each electrode and said center electrode including a noble metal chip made of a Pt alloy chip containing Pt as a first component and Re as a second component.

In this case, the first component signifies a component contained in largest quantity in the Pt alloy constituting the noble metal chip (43), while the second component signifies a component contained in second-largest quantity therein.

According to the present invention, the noble metal chip (43), made of an alloy comprising Pt and a different element, contains Re (rhenium), which increases the melting point or hardness of this noble metal chip so that the platinum grains are hard to grow up on a chip discharge surface. In fact, the holdback of the growth of the platinum grains (70) becomes further feasible, as compared with a conventional Pt alloy (see FIGS. 3 and 4).

Therefore, according to the present invention, in a spark plug in which at least one of the confronting portions of the center electrode (30) and the earth electrode (40) is produced using a noble metal chip (43) containing Pt as a principal component, this noble metal chip can restrain the crystal growth of an elongated globular structure during spark discharging even in a high-temperature atmosphere.

Furthermore, according to another aspect of the present invention, the noble metal chip (43) contains the first component Pt of not less than 50 weight %.

Thus, according to the present invention, in the noble metal chip (43), Pt of 50 weight % or more can be contained as the first component.

Still furthermore, according to a further aspect of the present invention, in the noble metal chip (43), the content of Re forming the second component is in a range from 5 weight % to below 50 weight %. This can appropriately and preferably realize the effects of the above-mentioned spark plug according to the present invention.

Yet furthermore, according to a further aspect of the present invention, the noble metal chip (43) has a globular structure.

Accordingly, in the initial state, the noble metal chip (43) can be formed into a globular structure without having a layer-like configuration. This can more easily hold back the growth of platinum grains.

In addition, according to a further aspect of the present invention, the noble metal chip (43) is made such that its hardness Hv0.5 is 200 or more at an ordinary temperature.

In this case, generally speaking, the ordinary temperature is approximately 25° C., and the hardness Hv0.5 is defined as a Vickers hardness when a load of 0.5 kg is applied thereto. Moreover, in the above-mentioned noble metal chip can be made to have a hardness Hv0.5 of not less than 200.

Still additionally, according to a further aspect of the present invention, it is preferable that the above-mentioned noble metal chip (43) has a melting point of not less than 1850° C.

Yet additionally, according to a further aspect of the present invention, preferably, the spark discharge gap (50) has a dimension in a range from 0.15 mm to 0.6 mm. The suppression of the growth of platinum balls and the prevention of the inter-electrode short-circuit are effective to such a narrowed-gap spark plug.

Moreover, according to a further aspect of the present invention, a relaxation layer (60) made of a Pt-based material having a thermal expansion coefficient between a thermal expansion coefficient of Pt and a thermal expansion coefficient of the electrode base material is interposed between the noble metal chip (43) and the electrode base material, and the noble metal chip (43) and the electrode base material are resistance-welded to each other in a state where the relaxation layer (60) is placed therebetween.

In this case, the Pt-based material is an alloy containing Pt, and the employment of the relaxation layer (60) is preferable in light of enhancing the drop-out effect of the noble metal chip (43) from the electrode base material.

Still moreover, according to a further aspect of the present invention, the relaxation layer (60) is made to have a balled configuration.

Although, in a case in which a relaxation layer has a layer-like configuration, the peeling-off of the relaxation layer easily occurs along the layer, the balled configuration can hold back the peeling-off of the relaxation layer, which leads to heightening the drop-out prevention of the noble metal chip from the electrode base material.

Yet moreover, it is also preferable that the relaxation layer (60) is made such that its hardness Hv0.5 at an ordinary temperature is not less than 200.

The effects of the above-mentioned means also properly shows up in a spark plug to be used for a gas engine.

The foregoing means designated at reference numerals in parentheses correspond to the concrete means in the embodiments which will be described later.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
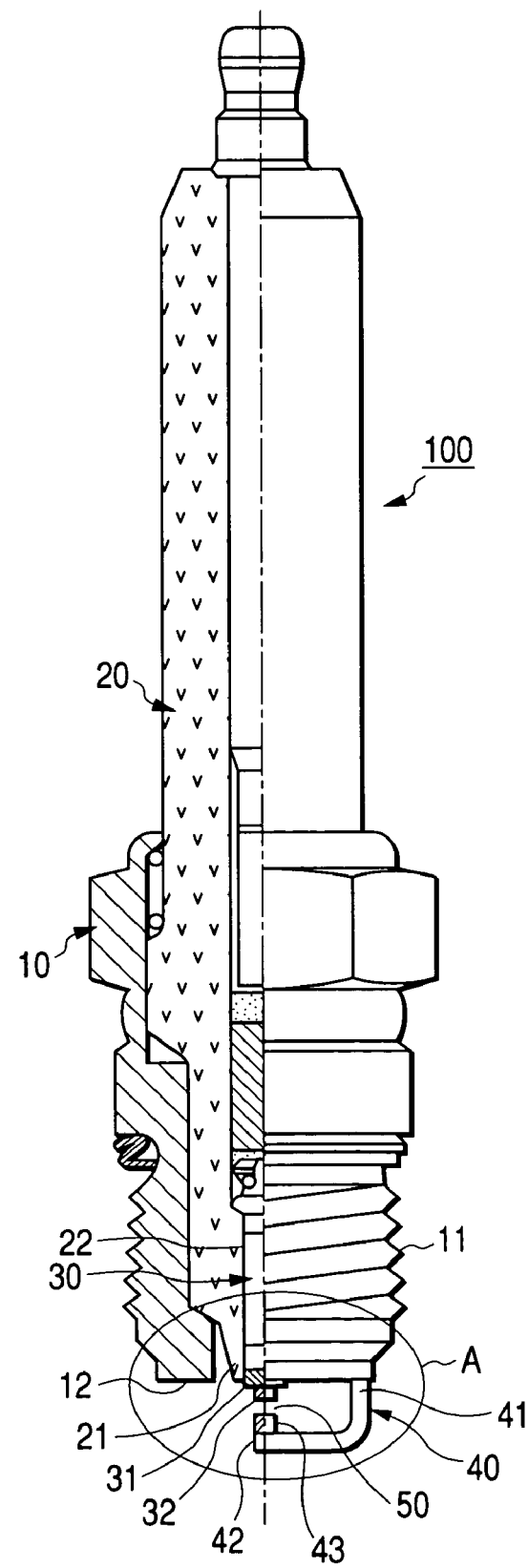
FIG. 1 is a semi-cross-sectional view showing the entire construction of a spark plug according to an embodiment of the present invention.
Figure 2:
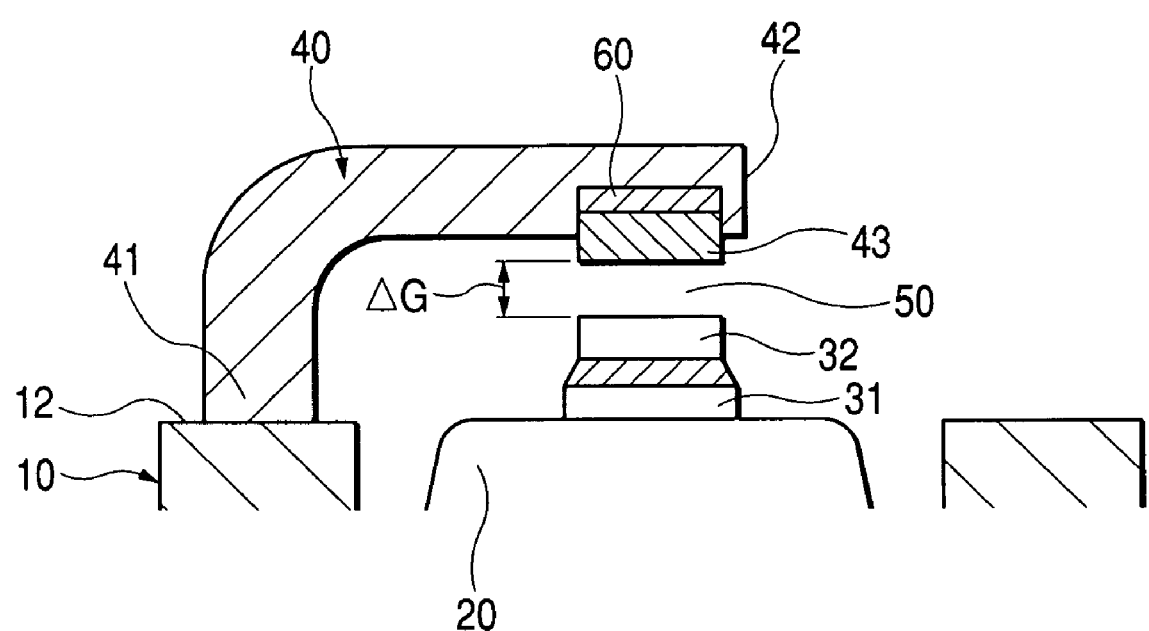
FIG. 2 is an illustration useful for explaining a portion, indicated by A in FIG. 1, in detail.

An embodiment of the present invention will be described hereinbelow with reference to the drawings. This embodiment relates to a spark plug for a gas engine of a generator for the cogeneration. FIG. 1 is a semi-cross-sectional view showing the entire construction of a spark plug according to this embodiment, and FIG. 2 is an illustration useful for explaining a circled portion, indicated by A in FIG. 1, in detail.

A spark plug, generally designated at reference numeral 100, is equipped with a cylindrical housing (fitting) 10, and this housing 10 includes a mounting screw portion 11 whereby the spark plug 100 is fixedly secured to an engine block (not shown). In the interior of the housing 10, an insulator 20 made of alumina ceramics ($Al_2O_3$) or the like is placed in a fixed condition, and a tip portion 21 of this insulator 20 is located to be exposed at one end surface 12 of the housing 10.

In an internal hole 22 of the insulator 20, a column-like center electrode 30 is fixed so that its tip portion 31 is exposed at the tip portion 21 of the insulator 20, and the center electrode 30 is held in an insulated condition with respect to the housing 10 in a state where the insulator 20 is interposed therebetween.

The center electrode 30 is composed of an internal material and an external material, with the internal material being a metallic material such as Cu superior in thermal conductivity and the external material being a metallic material such as an Ni-base alloy superior in heat resistance and corrosion resistance. To the aforesaid tip portion 31, a noble metal chip 32 (which will be referred to hereinafter as a "center electrode side chip 32") is attached by means of welding or the like, and this center electrode side chip 32 constitutes a part of the center electrode 30.

In this embodiment, the center electrode side chip 32 is an Ir alloy chip made from a disc-like Ir (iridium) alloy and is joined to the tip portion 31 forming an electrode base material of the center electrode 30 by means of laser welding.

Moreover, to one end surface 12 of the housing 10, a column-like earth (ground) electrode 40 made of an Ni-base alloy or the like is joined and fixed by means of welding or the like. The earth electrode 40 has one end 41 fixed to the one end surface 12 of the housing 10 and extends from the one end 41 to the other end 42, with it being halfway bent into a generally L-like configuration so that the other end 42 side portion confronts the tip portion 31 of the center electrode 30.

Still moreover, a noble metal chip 43 (which will be referred to hereinafter as an "earth electrode side chip 43) is attached through welding or the like to the other end 42 portion of the earth electrode 40 which is in opposed relation to the center electrode side chip 32 on the tip portion 31 of the center electrode 30. This earth electrode side chip 43 constitutes a portion of the earth electrode 40.

In this embodiment, the earth electrode 43 is a Pt alloy chip made from a disc-like alloy comprising Pt and an element different therefrom and is joined to the other end 42 forming the electrode base material of the earth electrode 40 by means of the resistance welding.

Yet moreover, in this embodiment, as shown in FIG. 2, a relaxation layer 60 made of a Pt-based material having an intermediate thermal expansion coefficient between those of Pt and the electrode base material is interposed between the earth electrode side chip 43 and the electrode base material, and the earth electrode side chip 43 and the electrode base material are resistance-welded to each other in a state where the relaxation layer 60 is placed therebetween.

The employment of the relaxation layer 60 is preferable because of increasing the effects of preventing the earth electrode side chip 43 from dropping out from the electrode base material. For example, the relaxation layer 60 can be made of Pt-20Ni comprising Ni of 20 weight % and Pt as the remaining material. Moreover, as the relaxation layer 60, it is preferable that the hardness Hv0.5 at the ordinary temperature is not less than 200. Incidentally, even in the case of no employment of the relaxation layer 60, the spark plug also will work.

In addition, the space between the confronting portions of both the chips 32 and 43 forms a spark discharge gap 50. As the required or desired value for a spark plug in a gas engine, the dimension ΔG of this spark discharge gap 50 is set in a range from 0.15 mm to 0.6 mm.

In the earth electrode side chip 43, the first component contained in largest quantity in the alloy is Pt while the second component contained in second-largest quantity therein is Re (rhenium). Naturally, the earth electrode side chip 43 can also contain other elements such as Ir as a component contained in third-largest quantity therein.

Concretely, in the earth electrode side chip 43, the content of Pt forming the first complement can be 50 weight % or more. Moreover, preferably, the content of Re forming the second component is in a range from 5 weight % to below 50 weight %. The hardness Hv0.5 of the earth electrode side chip 43 made in this way can be set at 200 or more, and the melting point thereof can be set at 1850° C. or more.

For example, as the earth electrode side chip 43, a two-component system comprising Pt and Re is employable, such as Pt-10Re comprising Re of 10 weight % and Pt forming the remainder or Pt-20Re comprising Re of 20 weight % and Pt forming the remainder.

Concretely, in the case of Pt-10Re, the hardness Hv0.5 is 230 to 250 and the melting point is approximately 1880° C. In the case of Pt-20Re, the hardness Hv0.5 is 200 or more and the melting point is approximately 2000° C. Incidentally, the melting point is calculated on the basis of the melting point of Pt being 1769° C. and the melting point of Re being 3166° C.

Furthermore, in this embodiment, the center electrode side chip 32 is made as an Ir alloy chip while the earth electrode side chip 43 is made as a Pt alloy chip, and this is because the temperature of the center electrode 30 is approximately 900° C. while the temperature of the earth electrode 40 is approximately 850 to 950° C.

In the spark plug 100 thus constructed, the spark discharge gap 50 side is inserted into a combustion chamber (not shown) of an engine for the cogeneration and a high voltage for the spark discharge is applied between the housing 10 and the center electrode 30 to generate the spark discharge in the spark discharge gap for combusting the fuel gas in the combustion chamber. As the high voltage, a minus voltage is applied to the center electrode side in a state where the earth electrode is grounded.

Meanwhile, as a unique arrangement, this embodiment is principally characterized in that, in the earth electrode side chip 43 made of an alloy comprising Pt and an element different therefrom, the first component of the alloy is Pt and the second component thereof is Re.

Accordingly, the melting point and hardness of this earth electrode side chip 43 increase and, hence, it is considered that the separation of the platinum grains becomes hard on the chip discharge surface. In fact, according to this embodiment, as shown in FIGS. 3A and 3B, it was confirmed that the growth of platinum grains 70 is suppressible as compared with a conventional Pt alloy chip.

Figure 3A:
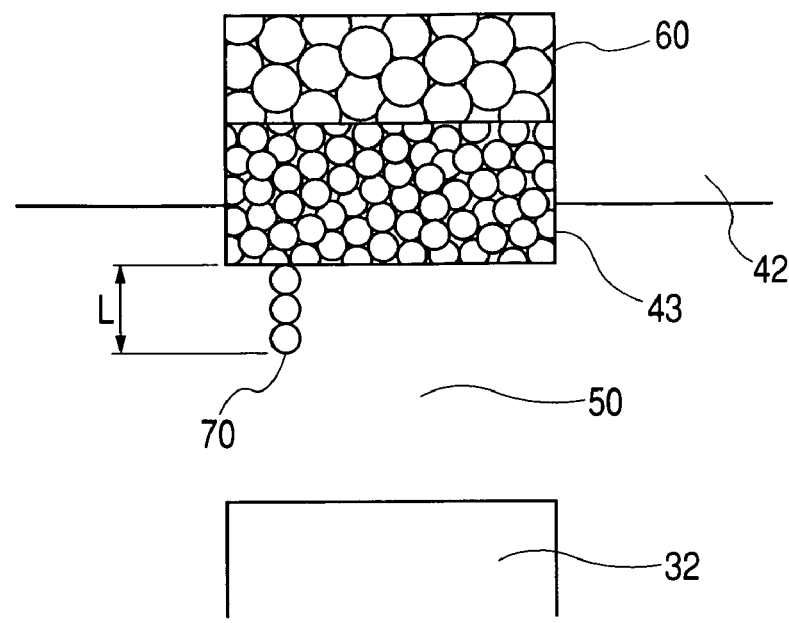
FIGS. 3A and 3B are illustrations of a concrete state of the suppression of growth of platinum balls in this embodiment.
Figure 3B:
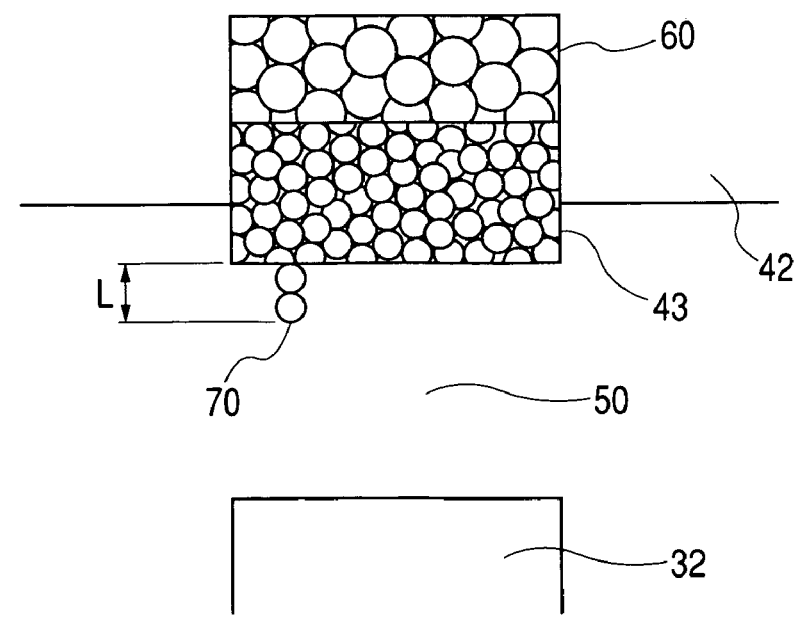

FIGS. 3A and 3B are illustrations of, in a case in which the spark plug 100 according to this embodiment is mounted in a gas engine for the cogeneration, the investigated grown-up lengths L of the platinum grains 70 as the result of experiment under the condition that the engine load is 100% and the engine speed is 750 rpm. In this case, the grown-up length L signifies the length L of the growth of the platinum grains 70 along the discharge path.

FIGS. 3A and 3B illustratively show a spark discharge portion and a portion around it for explaining the result of the experiment and observation by the present inventor. FIG. 3A shows a case of the employment of Pt-10Re as the earth electrode side chip 43 while FIG. 3B shows a case of the employment of Pt-20Re as the earth electrode side chip 43. In this case, the dimension ΔG of the spark discharge gap 50 is set at 0.3 mm, and Pt-20Ni is used as the relaxation layer 60.

Figure 5A:
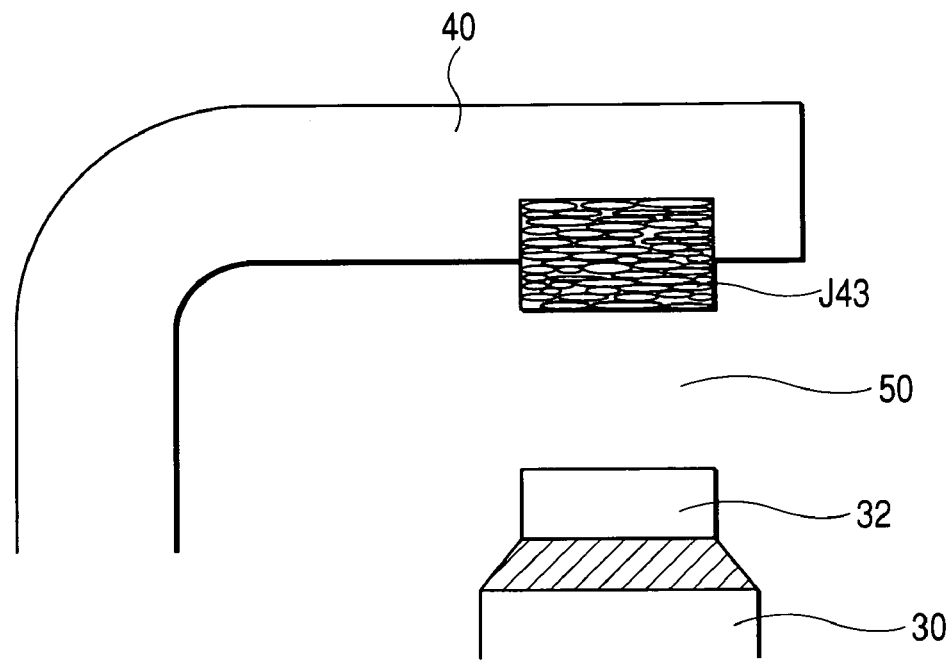
FIGS. 5A and 5B are illustrations for explaining a state of short-circuit between electrodes stemming from the growth of platinum balls, which occurs in a conventional spark plug.
Figure 5B:
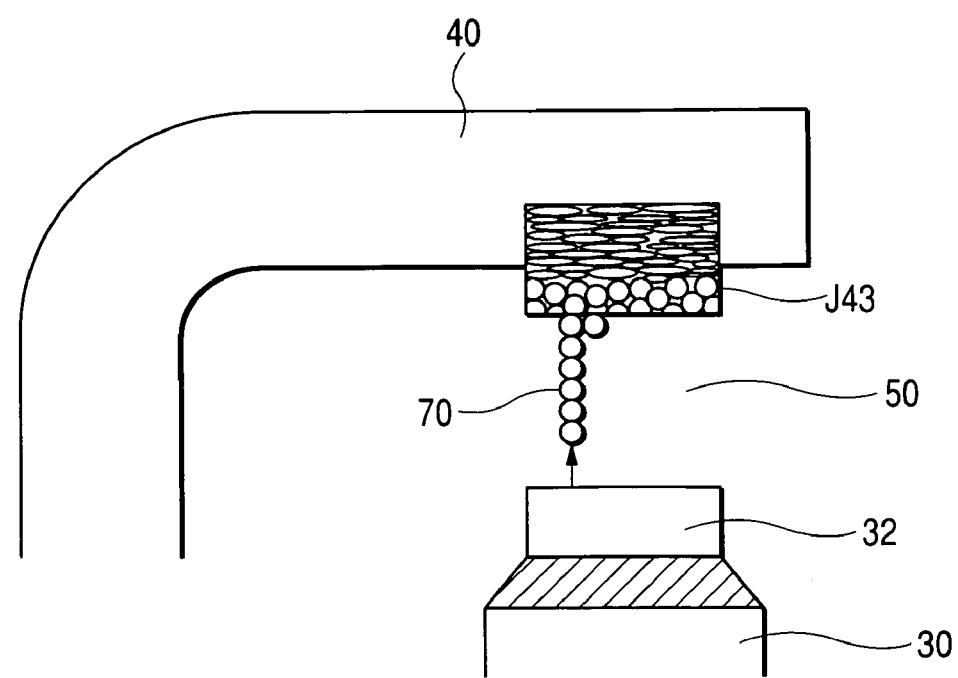

In this embodiment, since the earth electrode side chip 43 has the aforesaid unique arrangement, as shown in FIGS. 3A and 3B, the growth of the platinum grains 70 from the discharge surface is further suppressible as compared with the conventional Pt alloy chip J43 shown in FIGS. 5A and 5B. FIGS. 3A and 3B and FIGS. 5A and 5B show the states after the elapse of the same experiment time.

Figure 4:
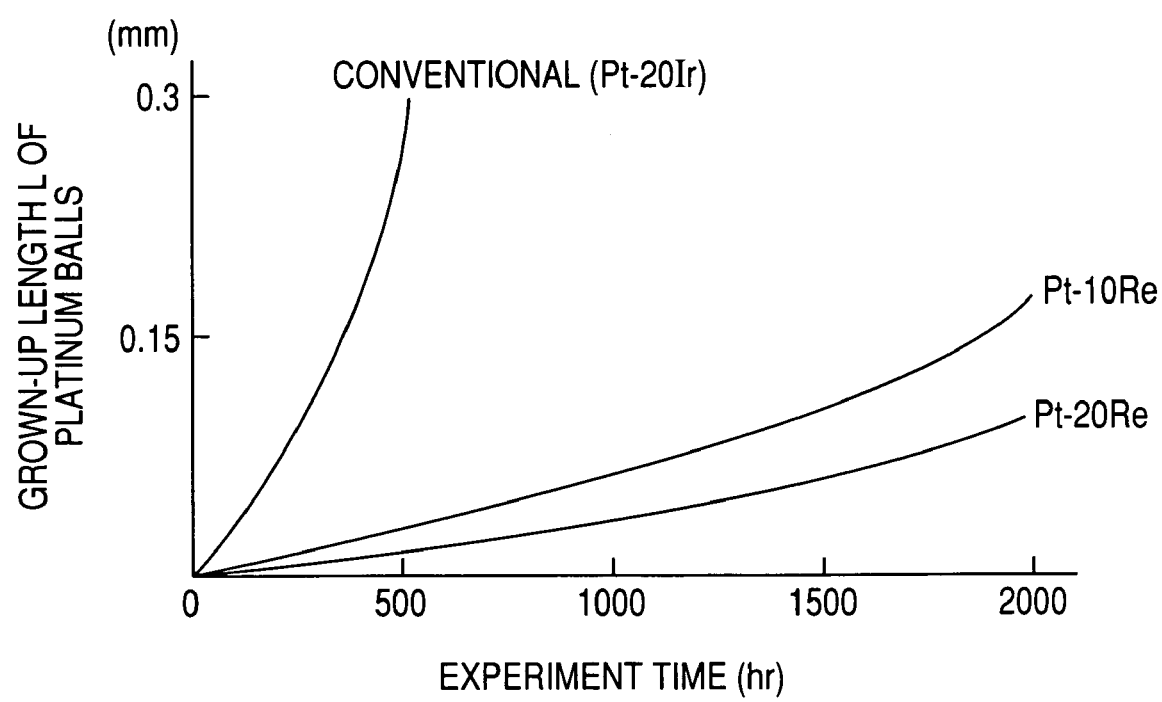
FIG. 4 is a graphic illustration of the platinum ball growth suppression effects according to this embodiment.

FIG. 4 concretely shows the suppression effects on the grown-up length L of the platinum grains 70 in this embodiment, and is an illustration of the relationship between the grown-up length L and the experiment time in a case in which Pt-10Re is employed as the earth electrode side chip 43, in a case in which Pt-20Re is employed therefor, and in the case of the conventional Pt-20Ir. From FIG. 4, it is seen that the effect of the growth suppression of the platinum grains 70 develops noticeably in the case of this embodiment.

In addition, in the examples shown in FIGS. 3A and 3B, the earth electrode side chip 43 according to this embodiment is formed into a globular structure. This signifies that, in an initial state, the earth electrode side chip 43 has a balled configuration instead of a layer-like configuration. Therefore, as compared with a case in which the earth electrode side chip 43 has a layer-like configuration in an initial state, the growth of the platinum grains 70 is more easily suppressible.

The earth electrode side chip 43 having this globular structure can be produced by heat-treating the chip 43 or the material of the chip 43 for the recrystallization so that the transformation from a layer-like configuration to a globular structure takes place. For example, the heat treatment can be conducted under the condition that it is placed at a temperature of 1200° C. for one hour in a vacuum state or in an inactive gas such as Ar (argon).

Still additionally, in the examples shown in FIGS. 3A and 3B, the relaxation layer 60 is formed into a globular structure. In a case in which the relaxation layer 60 has a layer-like configuration, the peeling-off of the relaxation layer 60 easily occurs along the layer. On the other hand, if the relaxation layer 60 has a globular structure, the peeling-off of the relaxation layer 60 is suppressible, which heightens the effect of preventing the peeling of the earth electrode side chip 43 from the electrode base material.

This relaxation layer 60 with a globular structure can be produced by heat-treating the material of the relaxation layer 60 for recrystallization so that the transformation from a layer-like configuration to a globular structure takes place. For example, the heat treatment can be conducted under the condition that it is placed at a temperature of 1100° C. for one hour in a vacuum state or in an inactive gas such as Ar (argon).

In this connection, in this embodiment, even in a case in which the earth electrode side chip 43 is made to have a layer-like configuration in an initial state without being formed into a globular structure in advance, in a case in which the relaxation layer 60 is initially formed into a layer-like configuration, or when the relaxation layer 60 is not employed, it was confirmed that, if the earth electrode side chip 43 is made to have the aforesaid unique arrangement, the growth of the platinum grains 70 is further suppressible as compared with the conventional arrangement.

Moreover, according to this embodiment, it is also appropriate that the center electrode side chip 32 is also resistance-welded to the electrode base material and is a Pt alloy chip made of an alloy comprising Pt and other element so that the first component of the alloy is Pt and the second component is Re. Also in this case, it is also possible that the aforesaid relaxation layer is interposed therebetween for the center electrode 30.

As described above, according to this embodiment, in the spark plug 100 in which one of or both the confronting portions of the center electrode 30 and the earth electrode 40 is made with a noble metal chip 32, 43 containing Pt as a principal component, owing to this noble metal chip 32, 43, the growth of the platinum balls is suppressible even in a high-temperature atmosphere.

This effect properly shows up in a spark plug according to this embodiment for use in a gas engine where the spark discharge gap 50 is narrowed to be in a range from 0.15 mm to 0.6 mm in dimension.

Naturally, according to the present invention, even if a spark plug, in which at least one of the confronting portions of the center electrode and the earth electrode which are in opposed relation to each other is constructed with a noble metal chip, is used as a spark plug for other than a gas engine, the effects similarly show up.

It should be understood that the present invention is not limited to the above-described embodiment, and that it is intended to cover all changes and modifications of the embodiment of the invention herein which do not constitute departures from the spirit and scope of the invention.

What is claimed is:

1. A spark plug comprising:
    a center electrode;
    an insulator provided outside said center electrode;
    a housing located outside said insulator; and
    an earth electrode whose one end portion is joined to said housing and whose other end portion is disposed to be in opposed relation to said center electrode in a state where a spark discharge gap is interposed therebetween,
    at least one of said earth electrode and said center electrode including a noble metal chip made of a Pt alloy containing Pt as a first component and Re as a second component, whereby a crystal growth of an elongated globular structure into the spark discharge gap during spark discharging under a high-temperature atmosphere is sunpressed, wherein said noble metal chip contains, as said first component, Pt of not less than 50 weight %.

2. The plug according to claim 1, wherein said noble metal chip contains, as said second component, Re in a range from 5 weight % to below 50 weight.

3. The plug according to claim 1, wherein said noble metal chip is formed to have a globular structure.

4. The plug according to claim 1, wherein said noble metal chip is made such that its hardness Hv0.5 is 200 or more at an ordinary temperature.

5. The plug according to claim 1, wherein said noble metal chip has a melting point of not less than 1850° C.

6. The plug according to claim 1, wherein said spark discharge gap has a dimension in a range from 0.15 mm to 0.6 mm.

7. The plug according to claim 1, wherein a relaxation layer made of a Pt-based material having an intermediate thermal expansion coefficient between a thermal expansion coefficient of Pt and a thermal expansion coefficient of said electrode base material is interposed between said noble metal chip and said electrode base material, and said noble metal chip and said electrode base material are resistance-welded to each other in a state where said relaxation layer is placed therebetween.

8. The plug according to claim 7, wherein said relaxation layer is made to have a globular structure.

9. The plug according to claim 7, wherein said relaxation layer is made such that its hardness Hv0.5 at an ordinary temperature is not less than 200.

10. The plug according to claim 1, wherein the spark plug is employed as a spark plug for use in a gas engine.

11. A spark plug comprising:
a center electrode;
an insulator provided outside said center electrode;
a housing located outside said insulator; and
an earth electrode whose one end portion is joined to said housing and other end portion is disposed in face-to-face relation with said center electrode via a spark discharge gap;
at least one of said earth electrode and said center electrode including a noble metal chip made of a Pt alloy chip containing as a first component, Pt of not less than 50 weight %, and as a second component, Re in a range from 5 weight % to below 50 weight %, to suppress a crystal growth of a globular structure into the spark discharge gap during spark discharging under a high-temperature atmosphere.

12. The plug according to claim 11, wherein said noble metal chip is formed to have a globular structure.

13. The plug according to claim 11, wherein said noble metal chip is made such that its hardness Hv0.5 is 200 or more at an ordinary temperature.

14. The plug according to claim 11, wherein said noble metal chip has a melting point of not less than 1850° C.

15. The plug according to claim 11, wherein said spark discharge gap has a dimension in a range from 0.15 mm to 0.6 mm.

16. The plug according to claim 11, wherein a relaxation layer made of a Pt-based material having an intermediate thermal expansion coefficient between a thermal expansion coefficient of Pt and a thermal expansion coefficient of said electrode base material is interposed between said noble metal chip and said electrode base material, and said noble metal chip and said electrode base material are resistance-welded to each other in a state where said relaxation layer is placed therebetween.

17. The plug according to claim 16, wherein said relaxation layer is made to have a globular structure.

18. The plug according to claim 16, wherein said relaxation layer is made such that its hardness Hv0.5 at an ordinary temperature is not less than 200.

19. The plug according to claim 11, wherein the spark plug is employed as a spark plug for use in a gas engine.

20. A spark plug comprising:
a center electrode;
an insulator provided outside said center electrode;
a housing located outside said insulator; and
an earth electrode whose one end portion is joined to said housing and whose other end portion is disposed to be in opposed relation to said center electrode in a state where a spark discharge gap is interposed therebetween,
at least one of said earth electrode and said center electrode including a noble metal chip made of a Pt alloy containing Pt as a first component and Re as a second component, whereby a crystal growth of an elongated globular structure into the spark discharge gap during spark discharging under a high-temperature atmosphere, wherein said noble metal chip contains, as said second component, Re in a range from 5 weight % to below 50 weight %.

21. The plug according to claim 20, wherein said noble metal chip is formed to have a globular structure.

22. The plug according to claim 20, wherein said noble metal chip is made such that its hardness Hv0.5 is 200 or more at an ordinary temperature.

23. The plug according to claim 20, wherein said noble metal chip has a melting point of not less than 1850° C.

24. The plug according to claim 20, wherein said spark discharge gap has a dimension in a range from 0.15 mm to 0.6 mm.

25. The plug according to claim 20, wherein a relaxation layer made of a Pt-based material having an intermediate thermal expansion coefficient between a thermal expansion coefficient of Pt and a thermal expansion coefficient of said electrode base material is interposed between said noble metal chip and said electrode base material, and said noble metal chip and said electrode base material are resistance-welded to each other in a state where said relaxation layer is placed therebetween.

26. The plug according to claim 25, wherein said relaxation layer is made to have a globular structure.

27. The plug according to claim 25, wherein said relaxation layer is made such that its hardness Hv0.5 at an ordinary temperature is not less than 200.

28. The plug according to claim 20, wherein the spark plug is employed as a spark plug for use in a gas engine.

* * * * *